US011928100B2

(12) United States Patent
Verma

(10) Patent No.: US 11,928,100 B2
(45) Date of Patent: Mar. 12, 2024

(54) METHOD AND SYSTEM FOR CREATING A UNIFIED DATA REPOSITORY

(71) Applicant: HCL America Inc., Sunnyvale, CA (US)

(72) Inventor: Prafull Verma, Sunnyvale, CA (US)

(73) Assignee: HCL America Inc., Sunnyvale, CA (US)

( * ) Notice: Subject to any disclaimer, the term of this patent is extended or adjusted under 35 U.S.C. 154(b) by 135 days.

(21) Appl. No.: 17/543,775

(22) Filed: Dec. 7, 2021

(65) Prior Publication Data

US 2023/0177040 A1 Jun. 8, 2023

(51) Int. Cl.
*G06F 16/23* (2019.01)
*G06F 16/215* (2019.01)

(52) U.S. Cl.
CPC ........ *G06F 16/2365* (2019.01); *G06F 16/215* (2019.01); *G06F 16/235* (2019.01)

(58) Field of Classification Search
None
See application file for complete search history.

(56) References Cited

U.S. PATENT DOCUMENTS

| 7,383,279 B2 * | 6/2008 | Tare | G06F 16/283 |
| | | | 707/999.102 |
| 9,105,000 B1 | 8/2015 | White et al. | |
| 9,323,801 B2 | 4/2016 | Morozov et al. | |
| 9,633,076 B1 | 4/2017 | Morton et al. | |
| 10,831,726 B2 | 11/2020 | Soza | |
| 11,176,028 B2 * | 11/2021 | Zhang | G06F 11/3684 |
| 11,477,332 B2 * | 10/2022 | Tokita | H04N 1/00244 |
| 2016/0171537 A1 * | 6/2016 | Fanous | G06F 16/25 |
| | | | 705/14.53 |
| 2016/0171542 A1 * | 6/2016 | Fanous | G06Q 30/0269 |
| | | | 705/14.54 |
| 2021/0306478 A1 * | 9/2021 | Tokita | H04N 1/00411 |
| 2023/0177040 A1 * | 6/2023 | Verma | G06F 16/2365 |
| | | | 707/692 |

FOREIGN PATENT DOCUMENTS

CN 104503982 A 2/2018

OTHER PUBLICATIONS

Nine Steps to Implement a Successful CMDB Project (https://cdn2.hubspot.net/hub/22769/file-13442315-pdf/docs/9stepscmdb.pdf?t=1409841531335).

* cited by examiner

*Primary Examiner* — Kim T Nguyen

(57) ABSTRACT

A method for creating a unified data repository of clean and accurate data records is disclosed. In some embodiments, the method includes identifying one or more Configuration Items (CIs) with same attribute value from at least two of a set of normalized dataset. Each of the set of normalized dataset is generated from a plurality of CIs fetched from a plurality of data sources. The method further includes merging the one or more CIs identified with same attribute value from at least two of the set of normalized dataset, based on a set of pre-defined prioritization rules, to create a golden dataset of the clean and accurate data records.

15 Claims, 5 Drawing Sheets

| Data Entity in Records 402a | Validated Value 404a |
|---|---|
| Windows 7 Enterprise K | Windows 7 Enterprise K |
| ©,®, ™,~, ï¿½ | BLANK ("") |
| Windows 7 Enterprise N | Windows 7 Enterprise N |
| NULL | BLANK ("") |
| Windows 7 | Windows 7 |

FIG. 4a

| Data Entity in Records 402b | Validated Value 404b |
|---|---|
| Windows 7 Enterprise K | Windows 7 Enterprise K |
| Windows 7 Enterprise N | Windows 7 Enterprise N |
| Windows 7 | Windows 7 |

FIG. 4b

METHOD AND SYSTEM FOR CREATING A UNIFIED DATA REPOSITORY

TECHNICAL FIELD

Generally, the invention relates to a data repository. More specifically, the invention relates to a method for creating a unified data repository of clean and accurate data records.

BACKGROUND

Currently, with rapid advancement in the field of Information Technology (IT), companies and organizations are increasingly producing large amount of data. Further, the data produced by the companies and the organizations are stored across various databases. The data stored in various databases includes different type of information in different formats. One of commonly used database to store data is Configuration Management Database (CMDB). The CMDB contains information about the class a CI belongs to; IT attributes like OS, memory, storage, version, AMC details, end of support, end of life, location, owner, dependencies, relationships, change history, services associated with it, etc.; and so forth. Further, the CMDB enables user to identify CIs relationship and interdependencies with other CIs present in the IT environment of a particular organization using a CI dependency map.

However, accuracy of data (i.e., the IT asset and the CIs) stored in conventionally used database, i.e., CMDB is critical for success of business processes of the companies and the organizations. As, the CMDB helps in analyzing impact of the CIs on associated services, therefore the success of the business processes will be at risk because of incomplete and inaccurate information about CIs in the CMDB. Moreover, quality of data stored in the CMDB may get eroded over a period of time due to duplicate CIs, outdated CI relationships, and stale CIs. Further, when the CMDB is updated manually from multiple data sources, there is always the possibility of recording the same CI multiple times due to different naming conventions or human errors. Similarly, if the CMDB is populated manually or from a single data source, some CIs may get omitted from the CMDB due to human error or lack of completeness in source data. Due to above listed in-accuracies of the CMDB, the CI relationship map showing dependency of a CI on other CIs becomes unreliable. This is because, the CMDB takes inaccurate or outdated CI as a basis for discovering the CI relationship. Similarly, stale CIs, or CIs that have not received any recent updates may show up in the CMDB even though they may have been removed from the IT environment. Therefore, suitable measures must be taken to remove bad data from the CMDB and update the CIs periodically to ensure the success of IT Service Management (ITSM) processes of various business processes of the companies and the organizations.

Therefore, there is a need of an efficient and reliable method for creating a unified data repository of clean and accurate data records of IT assets present in the IT environment of the organization.

SUMMARY OF INVENTION

In one embodiment, a method for creating a unified data repository of clean and accurate data records is disclosed. The method may include identifying one or more Configuration Items (CIs) with same attribute value from at least two of a set of normalized dataset. It should be noted that, each of the set of normalized dataset is generated from a plurality of CIs fetched from a plurality of data sources. The method may further include merging the one or more CIs identified with same attribute value from at least two of the set of normalized dataset, based on a set of pre-defined prioritization rules, to create a golden dataset of the clean and accurate data records.

In another embodiment, a system for creating a unified data repository of clean and accurate data records is disclosed. The system may include a processor and a memory communicatively coupled to the processor. The memory may store processor-executable instructions, which, on execution, may cause the processor to identify one or more Configuration Items (CIs) with same attribute value from at least two of a set of normalized dataset. It should be noted that, each of the set of normalized dataset is generated from a plurality of CIs fetched from a plurality of data sources. The processor-executable instructions, on execution, may further cause the processor to merge the one or more CIs identified with same attribute value from at least two of the set of normalized dataset, based on a set of pre-defined prioritization rules, to create a golden dataset of the clean and accurate data records.

In yet another embodiment, a non-transitory computer-readable medium storing computer-executable instruction for creating a unified data repository of clean and accurate data records is disclosed. The stored instructions, when executed by a processor, may cause the processor to perform operations including identifying one or more Configuration Items (CIs) with same attribute value from at least two of a set of normalized dataset. It should be noted that, each of the set of normalized dataset is generated from a plurality of CIs fetched from a plurality of data sources. The operations may further include merging the one or more CIs identified with same attribute value from at least two of the set of normalized dataset, based on a set of pre-defined prioritization rules, to create a golden dataset of the clean and accurate data records.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals

FIGS. 4a-4b is an exemplary representation of the plurality of CIs fetched from the plurality of data sources, depicted via tables, in accordance with some embodiments of the present disclosure.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
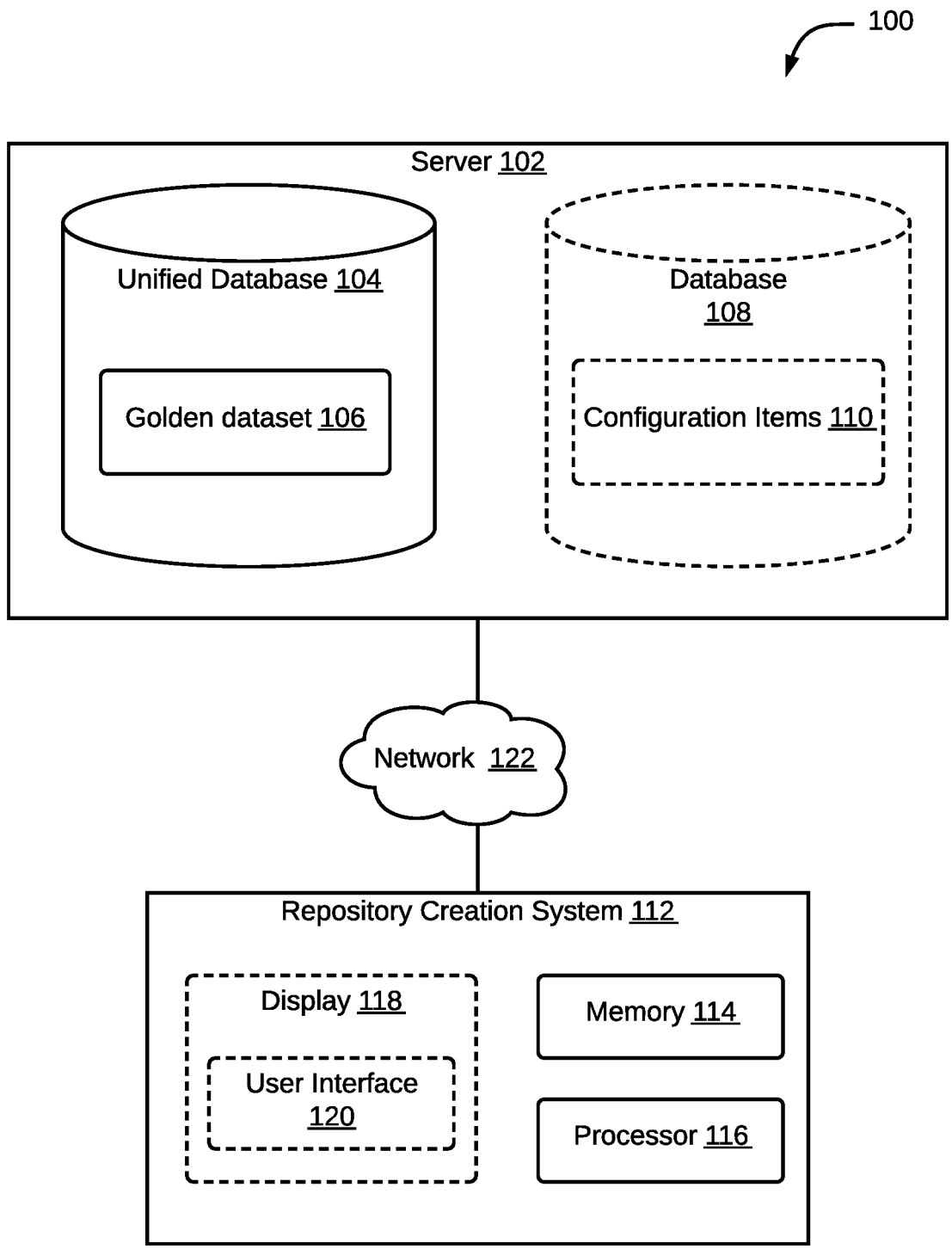
FIG. 1 illustrates a block diagram of an exemplary system for creating a unified data repository of clean and accurate data records, in accordance with some embodiments of the present disclosure.

Referring now to FIG. 1, a block diagram of an exemplary system 100 for creating a unified database 104 of clean and accurate data records is illustrated, in accordance with some embodiments of the present disclosure. In an embodiment, the unified database 104 may also be referred as a unified data repository. In addition, the clean and accurate data records may correspond to a golden dataset 106 created based on a plurality of Configuration Items (CIs) 110. In order to create the golden dataset 106, the exemplary system 100 may include a repository creation system 112. The repository creation system 112 may be connected to a server 102 via a network 122. Moreover, the repository creation system 112 may fetch information related to the plurality of CIs 110 via the network 122. The network 122, for example, may be any wired or wireless communication network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS).

Further, the server 102 may include the unified database 104. The unified database 114 may be configured to store the golden dataset 106 created based on the one or more of the plurality of CIs 110. In addition, the server 102 may be configured to store the plurality of CIs 110 fetched from the plurality of data sources in the database 108. In an embodiment, the database 108 may be periodically updated based on a new set of CIs fetched from a new data source.

Initially, the repository creation system 112 may fetch the plurality of CIs 110 stored in the database 108 via the network 122. In an embodiment, the plurality of CIs 110 may be fetched from the plurality of data sources via the network 122. Examples of the plurality of data sources may include, but is not limited to, one of a Configuration Management Database (CMDB), a manual channel, a directory service, a discovery tool, a monitoring data source, an event management tool, and a patching tool.

Once the plurality of CIs is fetched from the plurality of data sources, the repository creation system 112 may be configured to perform data validation on each of the plurality of CIs 110 to generate a validated dataset. The data validation may be performed on each of the plurality of CIs by removing one or more erroneous CIs from the plurality of CIs. The one or more erroneous CIs removed from the plurality of CIs may include at least one of a NULL value, a junk value, and a special character. In an embodiment, the one or more erroneous CIs may be removed based on a set of pre-defined validation rules.

Upon generating the validated dataset, the repository creation system 112 may be configured to normalize the validated dataset. The validated dataset may be normalized to generate a set of normalized dataset. Moreover, in order to normalize the validated dataset, one or more representations of same CIs in the validated dataset may be replaced with a standard representation. In an embodiment, the validated dataset may either be normalized manually or automatically. In order to manually normalize the validated dataset a set of pre-defined normalization rules may be used. In addition, in order to automatically normalize the validated dataset a standard product catalogue may be used.

Once the set of normalized data set is generated, the repository creation system 112 may be configured to perform aggregation of one or more CIs present in each of the set of normalized dataset. In order to perform aggregation, the repository creation system 112 may be configured to identify one or more CIs with same attribute value from at least two of the set of normalized dataset. In an embodiment, in order to identify the one or more CIs with same attribute value, at least one of a user defined attribute may be used. Once the one or more CIs with same attribute value are identified, the repository creation system 112 may merge the one or more CIs identified with same attribute value to create the golden dataset 106 of the clean and accurate data records. In order to merge the one or more CIs having the same attribute value, the set of pre-defined prioritization rules may be used. The set of pre-defined prioritization rules may include at least one of a set of class prioritization rules and a set of attribute prioritization rules.

Further, the repository creation system 112 may send and store the golden dataset 106 in the unified database 104 via the network 122. The golden dataset 106 created may further be used by a plurality of software applications in Information Technology Service Management (ITSM), Information Technology Asset Management (ITAM), and similar other Information Technology (IT) management. In an embodiment, the repository creation system 112 may correspond to a computing device. Examples of the computing device may include but are not limited to, a desktop, a laptop, a notebook, a netbook, and a tablet.

The repository creation system 112 may further include a memory 114, a processor 116, and a display 118. The display 118 may further include a user interface 120. A user or an administrator may interact with the repository creation system 112 and vice versa through the display 118 including the user interface 120. The display 118 may be used to display results (i.e., the golden dataset) based on actions performed by the repository creation system 112, to the user. In addition, the display 118 may be used to render the set of pre-defined validation rules, the set of pre-defined normalization rules, the set of pre-defined prioritization rules, and the at least one of the user-defined attribute to the user. The user interface 120 may be used by the user to provide inputs to the repository creation system 112. Thus, for example, in some embodiments, the repository creation system 102 may ingest user selection of at least one of the set of pre-defined normalization rules and the at least one of the user-defined attribute via the user interface 120. In other words, the user may provide his selection of at least one of the set of pre-defined normalization rules and at least one of the user defined attribute (e.g., type of a new CI, classification of the one or more CIs identified, etc.) via the user interface 120. Further, for example, in some embodiment, the repository creation system 112 may render intermediate results (e.g., the validated dataset, the normalized dataset, and the one or more CIs identified with the same attribute value) or final results (e.g., the golden dataset) to the user via user interface 120.

The memory 114 may store instructions that, when executed by the processor 116, may cause the processor 116 to create the unified database 104 that includes the golden dataset 106 of clean and accurate data records. In order to create the golden dataset 106, the processor 116 in conjunction with the memory 114 may perform various functions including fetching of the plurality of CIs 110 from the plurality of data sources, generation of the validated dataset, generation of the set of normalized dataset, identification of the one or more CIs with the same attribute value, and merging of the one or more CIs identified with the same attribute value. This has been further explained in detail in conjunction to FIG. 2 to FIG. 6.

The memory 114 also stores various data (e.g., the set of pre-defined validation rules, the set of pre-defined normalization rules, the set of pre-defined prioritization rules, etc.) that may be captured, processed, and/or required by the repository creation system 112. The memory 114 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.).

Figure 2:
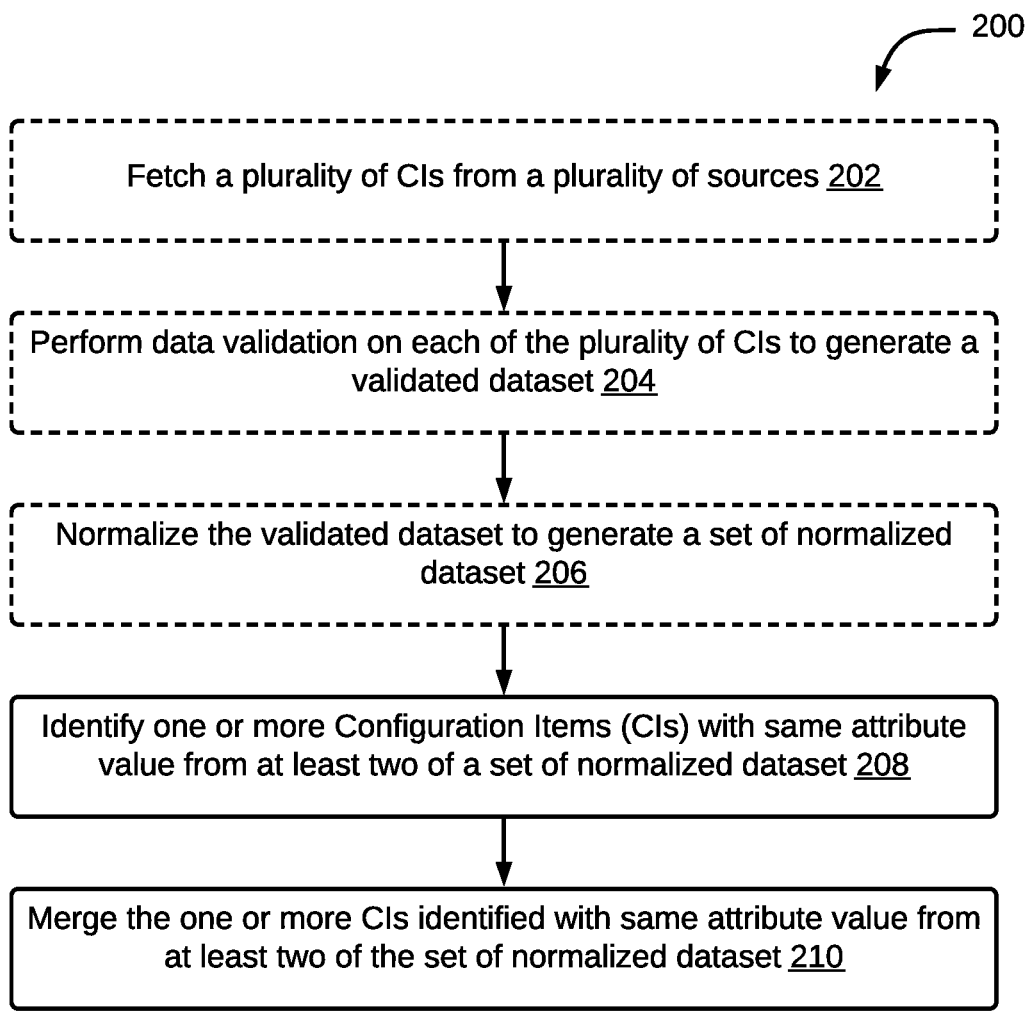
FIG. 2 illustrates a flow diagram of a process for creating a unified data repository of clean and accurate data records, in accordance with some embodiments of the present disclosure.

Referring now to FIG. 2 a flow diagram of process 200 of creating a unified data repository of clean and accurate data records is depicted via flowchart, in accordance with some embodiments of the present disclosure. In reference to FIG. 1, the unified data repository may correspond to the unified database 104. In order to create the unified data repository, at step 202, a plurality of CIs may be fetched from a plurality of data sources. In an embodiment, each of the plurality of CIs may correspond to any component that needs to be managed in order to deliver an IT service in an IT environment of a particular organization. Examples of the plurality of data sources may include, but is not limited to, a CMDB, a manual channel, a directory service, a discovery tool, a monitoring data source, an event management tool, and a patching tool. In reference to FIG. 1 the plurality of CIs may correspond to the plurality of CIs 110 stored in the database 108.

Once the plurality of CIs is fetched, at step 204, data validation may be performed on each of the plurality of CIs fetched from the plurality of data sources. The data validation may be performed on each of the plurality of CIs to generate a validated dataset. Moreover, in order to perform the data validation, one or more erroneous CIs may be removed from the plurality of CIs. The one or more erroneous CIs may include at least one of a NULL value, a junk value, and a special character. In order to remove the one or more erroneous CIs from the plurality of CIs a set of pre-defined validation rules may be used. A technique of removing the one or more erroneous CIs from the plurality of CIs fetched is explained in greater detail in conjunction to FIG. 3 and FIG. 4.

Upon generating the validated dataset, at step 206, the validated dataset may be normalized to generate a set of normalized dataset. In order to normalize the validated dataset, one or more representations of same CIs in the validated dataset may be replaced with a standard representation. In an embodiment, the validated dataset may either be normalized manually using a set of pre-defined normalization rules or automatically based on a standard product catalogue. A technique of normalizing the validated dataset has been explained in greater detail in conjunction with FIG. 3 and FIG. 5.

Once the set of normalized dataset is generated, at step 208, one or more CIs with same attribute value may be identified from at least two of the set of normalized dataset. In other words, in order to identify the one or more CIs with same attribute value, different representations of the one or more CIs with same attribute value present in the set of normalized dataset that are available in customer IT environment may be identified. Moreover, the one or more CIs with same attribute value may be identified based on at least one of a user defined attribute.

Upon identifying the one or more CIs with same attribute value, at step 210, the one or more CIs identified with same attribute value may be merged. The one or more CIs with the same attribute value may be merged to create a golden dataset of the clean and accurate data records. In other words, in order to merge the one or more CIs having the same attribute value, the one or more CIs with same attribute value present in each of the set of normalized dataset may be consolidated. In order to consolidate the one or more CIs having the same attribute value, the one or more CIs with the same attribute present in one or more of the set of normalized dataset may be removed to avoid duplicate records of the one or more CIs with same attribute value. In other words, one unique representation may be generated for each of the one or more CIs having the same attribute value. The unique representation of each of the one or more CIs with the same attribute value may be generated to create the golden dataset of clean and accurate data records. In an embodiment, the merging of the one or more CIs may be done based on a set of pre-defined prioritization rules. The set of pre-defined prioritization rules may include at least one of a set of class prioritization rules and a set of attribute prioritization rules. The golden dataset is represented and explained in greater detail in conjunction to FIG. 6.

Figure 3:
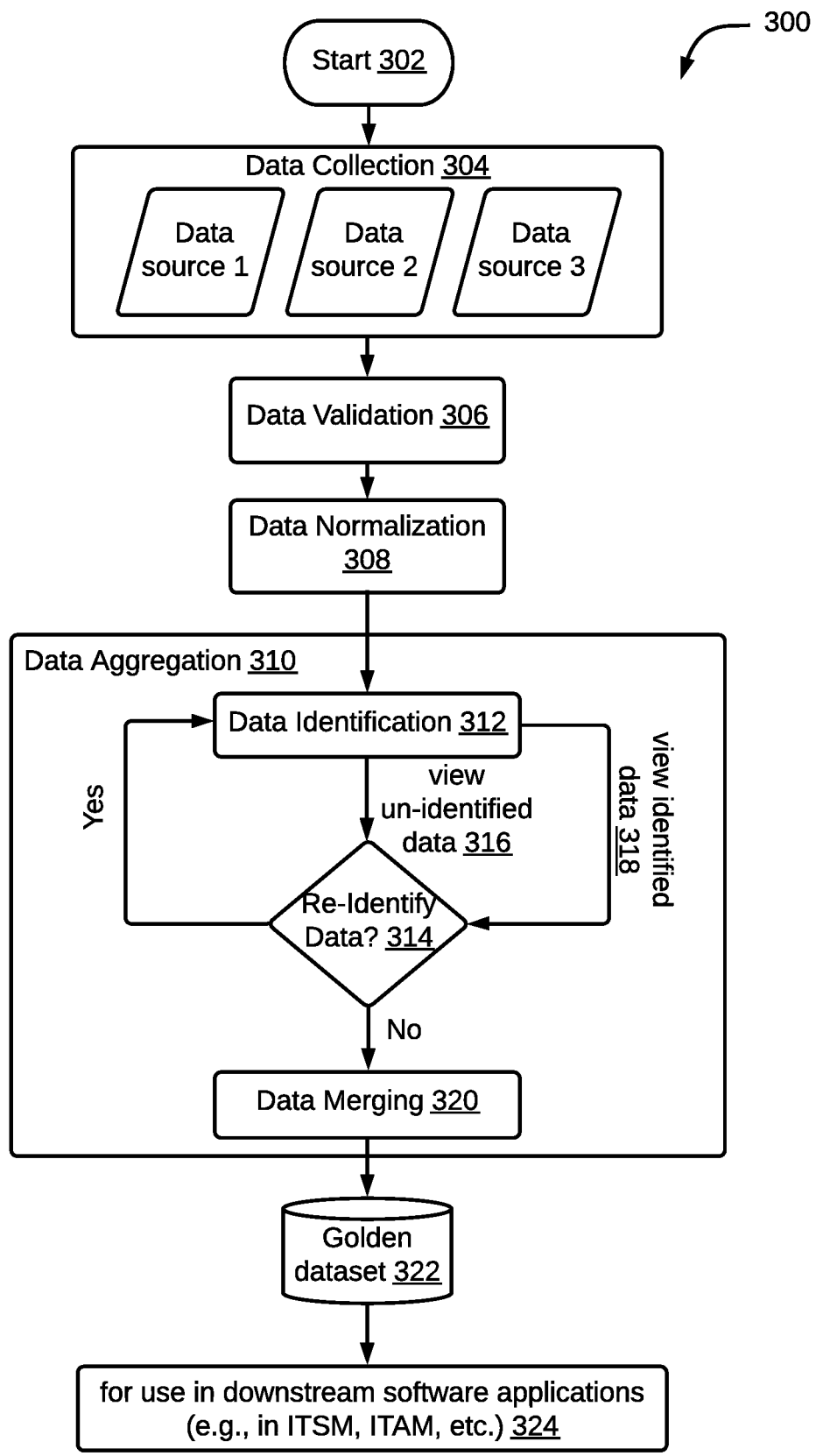
FIG. 3 illustrates a flow diagram of an exemplary process for creating a unified data repository of clean and accurate data records, in accordance with some embodiments of the present disclosure.

Referring now to FIG. 3, a flow diagram of an exemplary process 300 for creating a unified data repository of clean and accurate data records is depicted via flowchart in accordance with some embodiment of the present disclosure. In reference to FIG. 1, the unified data repository may correspond to the unified database 104. Additionally, the clean and accurate data record may correspond to the golden dataset 106. At step 302, the repository creation system 112 depicted in FIG. 1 may start the exemplary process 300 of creation of the unified data repository. Once the exemplary process 300 is started, at step 304, collection of data from a plurality of data sources may start. As depicted in the present FIG. 3, the plurality of data sources may correspond a data source 1, data source 2, and a data source 3. In an embodiment, the plurality of data sources may include at least one of the CMDB, the manual channel, the directory service, the discovery tool, the monitoring data source, the event management tool, and the patching tool. Further, the data collected from the plurality of data sources may correspond to the plurality of CIs. In reference to FIG. 1, the plurality of CIs fetched from the plurality of data sources may correspond to the plurality of CIs 110.

Once the plurality of CIs is collected, at step 306, each of the plurality of CIs may be validated. The plurality of CIs may be validated in order to generate the validated dataset. In order to generate the validated dataset, the one or more erroneous CIs may be removed from the plurality of CIs. The one or more erroneous may include at least one of the NULL value, the junk value, and the special character. In an embodiment, the one or more erroneous CIs may be removed based on the set of pre-defined validation rules. In other words, in order to generate the validated dataset, the plurality of CIs may be refined to eliminate the NULL value, the junk value, and the special character from the plurality of CIs based on the set of pre-defined validation rules. This is further explained in detail in conjunction with FIG. 4.

Once the validated dataset is generated, at step 308, normalization of values of the one or more CIs present in the validated dataset may be performed to generate the set of normalized dataset. In order to generate the set of normalized dataset, one or more representation of the same CIs present in the validated dataset may be replaced with the standard representation. In other words, alternate representation of the same CIs present in the validated dataset may be replaced with a normalized value, i.e., the standard representation. Moreover, each of the one or more representation of the same CIs may be separately standardize against the standard representation. The replacement of the one or more representation of the same CIs with the standard representation may either be done based on the set of manually defined representations or based on the standard representations from the inbuilt product catalogue. An objective behind generation of the set of normalized dataset may include homogenous representation of the same CIs for consistent reporting.

Once the set of normalized data set is generated, at step 310, aggregation of one or more CIs present in the set of normalized dataset may be performed to generate a golden dataset 322. In reference to FIG. 1, the golden dataset may correspond to the golden dataset 106. In order to perform aggregation as mentioned in step 310, at step 312, identification of one or more CIs with same attribute value from at least two of the set of normalized dataset may be performed. In an embodiment, the identification of the one or more CIs with same attribute value may be done based on the user defined unique attribute. In other words, the user may define an attribute value based on which the identification may be done for the one or more CIs having the defined attribute value present in at least two of the set of normalized dataset.

Upon identifying the one or more CIs with same attribute value, at step 314, a check may be performed to determine whether there is a need of re-identification of the one or more CIs having the same attribute value. In other words, the check may be performed to determine whether each of the one or more CIs having the same attribute value are identified or not. In one embodiment, based on the check performed, if a CI from the one or more CIs having the same attribute value are viewed as an un-identified data 316, then the unidentified data 316 (i.e., the one or more CIs having same attribute value) may be sent back to the step 312 for identification of the CI. In another embodiment, based on the check performed, when each of the one or more CIs having the same attribute value are viewed as an identified data 318, then the identified data 318 (i.e., each of the or more one CIs having same attribute value) may be sent for merging as represented via step 320. A process mentioned in the step 312 and the step 314, i.e., the identification of the one more CIs having the same attribute value and checking of the one or more CIs identified may be re-iterated until each of the one or more CIs having the same attribute value present in the set of normalized dataset are identified.

Once each of the one or more CIs with the same attribute values are identified, at step 320, the one or more CIs identified with the same attribute value from at least two of the set of normalized dataset may be merged to create the golden dataset 322 of the clean and accurate data records. In other words, the one or more CIs having the same attribute value may be merged to create one unique representation for each of the one or more CIs identified with the same attribute value. In an embodiment, the merging of the one or more may be done based on the set of pre-defined prioritization rules. The set of pre-defined prioritization rules may include at least one of the set of class prioritization rules and the set of attribute prioritization rules.

In an embodiment, the set of class prioritization rules may enable classification of the one or more CIs identified with the same attribute value in one of a plurality of pre-defined class categories based on a class associated with each of the one or more CIs identified. Examples of the plurality of pre-defined class categories may include, but is not limited to, server, telecommunication, network, storage, hardware, end-user computing (EUC). Further, the set of attribute prioritization rules may enable classification of the one or more CIs identified with the same attribute value in one of a plurality of pre-defined attribute categories based on an attribute associated with each of the one or more CIs identified. The attribute associated with the one or more CIs identified with the same attribute value may represent characteristics or properties associated with the one or more CIs identified. Examples of the plurality of pre-defined attribute categories may include, but is not limited to, Operating System (OS) name, disc space, memory, and cores.

In one embodiment, in order to merge the one or more CIs with the same attribute value based on the set of class prioritization rules, a priority may be defined for each of the plurality of data sources for one of the plurality of pre-defined class categories. Hence, information, i.e., the one or more CIs identified with the same attribute value coming from data source that is higher in priority for the one of the plurality of pre-defined class categories may be selected for creating the golden dataset 322. By way of an example, the CMDB data source may be defined as a highest priority data source for a server class. Hence, the one or more CIs identified with the same attribute value that are from the CMDB data source and are of the server class may be selected for merging in order to create the golden dataset 322.

In another embodiment, in order to merge the one or more CIs identified with the same attribute value based on the set of attribute prioritization rules, a priority may be defined for each of the plurality of data sources for a particular attribute category from the plurality of pre-defined attribute categories present within one of the plurality of pre-defined class categories. Hence, information, i.e., the one or more CIs identified with the same attribute value coming from data source that is higher in priority for the particular attribute present within the one of the plurality of pre-defined class categories may be selected for creating the golden dataset 322. By way of an example, the CMDB data source may be defined as a highest priority data source for a memory attribute present within the server class. Hence, the one or more CIs identified with the same attribute value that are from the CMDB data source and are of the server class having the memory attribute may be selected for merging in order to create the golden dataset 322.

In case of clash between the one or more CIs identified with the same attribute value, the set of attribute prioritization rules may supersede the set of class prioritization rules. By way of an example, suppose two of the one or more CIs identified with the same attribute value of the CMDB data source may have same class category (e.g., the server class). However, the attribute category for each of the two of the one or more CIs identified may be different. For example, one CI may have the OS name as an attribute category, while second CI may have the memory as an attribute category. Now, if the set of attribute prioritization rules is set higher for the memory attribute category of the server class of the CMDB data source, then the second CI from the two of the one or more CIs identified having the memory as the attribute category for the server class of the CMDB data source may be considered for creating the golden dataset.

In an embodiment, the set of prioritization rules may be uniquely defined for an IT environment of a particular organization based on requirement of the particular organization. As will be appreciated, the creation of the unified data repository including the golden dataset 322 may also be done for a plurality of IT assets present in the IT environment of the particular company instead of the plurality of CIs. Once the golden dataset 322 is generated, at step 324, the generated golden dataset 322 may be used in a number of downstream software applications, such as in ITSM, ITAM, or for some other similar IT management applications, for refining data (i.e., the plurality of CIs, or the plurality of assets) for reconciliation purpose.

By way of an example, a resource unit management database (RUMDB) for a particular IT organization may be created based on the generated golden dataset 322. The RUMDB may be created for each of a plurality of Resource Units (RUs). In an embodiment, the RU may correspond to a tangible or an intangible entity that provides a measure of workload or efforts required to deliver and support IT services. Moreover, each of the plurality of RUs may be contractually defined by customer (i.e., the organization for which the RUMDB needs to be created) and is specified in contract provided by the customer disclosing details of how a particular RU has to be billed. In order to create the RUMDB, a set of billable service resource components may be identified. As will be appreciated, with reference to present invention, the set of service billable components may correspond to the plurality of CIs or the plurality of IT asset. Further, each of the set of golden dataset may be paired with a correct RU from the plurality of RUs to arrive at the total RU count. The RUMDB disclosed in present application has been disclosed and described in greater detail in commonly assigned U.S. patent application Ser. No. 17/184,714, entitled "RESOURCE UNIT MANAGEMENT DATABASE AND SYSTEM FOR STORING AND MANAGING INFORMATION ABOUT INFORMATION TECHNOLOGY RESOURCES" and filed on 25 Feb. 2021, the disclosure of which is incorporated by reference herein in its entirety.

Referring now to FIGS. 4a-4b, an exemplary representation of the plurality of CIs fetched from the plurality of data sources is depicted via tables, in accordance with some embodiments of the present disclosure. In FIG. 4a, a table 400a represent each of the plurality of CIs fetched from the plurality of data sources that may include the one or more erroneous CIs. In an embodiment, the one or more erroneous CIs may include at least one of the NULL value, the junk value, and the special character. Examples of the plurality of CIs may include, but is not limited to, services, software, hardware, documents, devices, locations, and staff. In addition, examples of the plurality of data sources may include, but is not limited to, the CMDB, the manual channel, the directory service, the discovery tool, the monitoring data source, the event management tool, and the patching tool.

In FIG. 4a, each row of a column 402a, "Data entity in records" may represent the plurality of CIs fetched from the plurality of data sources. As depicted via the column 402a of the table 400a, the plurality of CIs fetched from the plurality of data sources may include the one or more erroneous CIs. For ease of explanation, a set of five CIs fetched from the plurality of data sources are depicted via the table 400a. In the set of five CIs fetched, second row and fourth row of the column 402a represents the one or more erroneous CIs (i.e., "©,®,™, ~, ï¿½", and "NULL"). In order to remove the one or more erroneous CIs from the set of five CIs, the data validation may be performed for each of the set of five CIs. In an embodiment, the data validation may be performed based on the set of pre-defined validation rules. Upon performing the data validation, each of the one or more erroneous CIs may be marked "Blank" as represented via second row and fourth row of a column 404a, i.e., validated value.

Once the one or more erroneous CIs are identified and marked, the one or more erroneous CIs may be filtered out to generate the validated dataset as represented via a table 400b. In table 400b, a column 402b, "Data entity in records" may represent a set of CIs that are not erroneous and are left after the data validation is performed on the plurality of CIs fetched. By way of an example, a set of three CIs that are not erroneous and are left after the data validation is performed on the set of five CIs is represented via the table 400b. Further, each row of a column 404b, "Validated Values" may represent validated values of each of the set of CIs that are identified to be non-erroneous.

Figure 5:
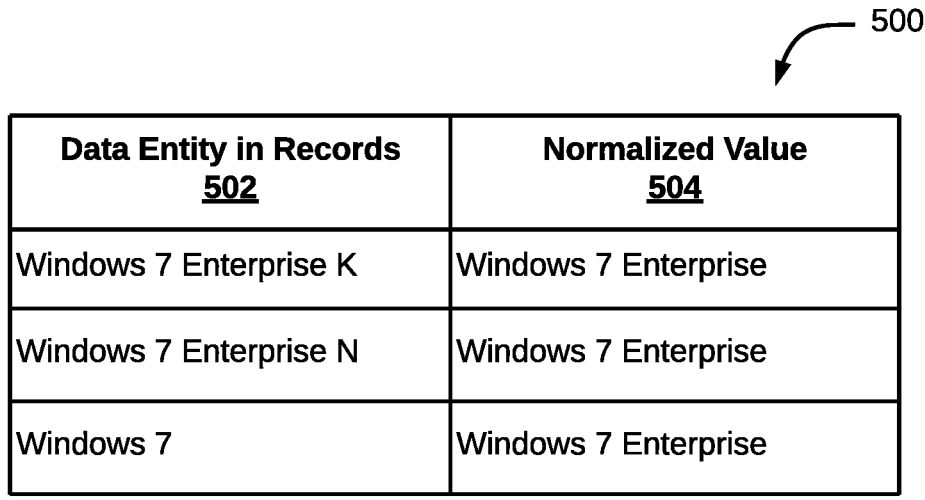
FIG. 5 is an exemplary representation of a normalized dataset generated based on the validated dataset, depicted via a table, in accordance with some embodiments of the present disclosure.

Referring now to FIG. 5, an exemplary representation of a normalized dataset generated based on the validated dataset is depicted via a table 500, in accordance with some embodiments of the present disclosure. In the table 500 of present FIG. 5, each row of a column 502, "Data entity in Records" may represent validated values of each of the plurality of CIs fetched from the plurality of data sources. In reference to FIG. 4b, the column 502 of the table 500 may correspond to the column 404b of the validated dataset represented via the table 400b. Upon receiving the validated values as represented via the column 502, data normalization may be performed on each of the validated values of the plurality of CIs to generate the set of normalized dataset. In an embodiment, normalization each of the validated values to generate the set of normalized dataset may either be performed manually based on the set of pre-defined prioritization rules or automatically using the standard product catalogue. In present embodiment, the set of normalized dataset generated based on the validate values of each of the plurality of CIs may be represented as depicted via a column 504, "Normalized values".

In other words, each row of the column 504 may represent normalized representation the validated value generated for each of the plurality of CIs present in corresponding row of the column 502. In an embodiment, in order to generate the set of normalized dataset based on the validated dataset, the one or more representation of same CIs present in the validated data may be replaced with standard representation. By way of an example, with reference to present FIG. 5, first row of the column 502, representing "Windows 7 Enterprise K", second row of the column 502, representing "Windows 7 Enterprise N", and third row of the column 502, representing "Windows 7" may be normalized by replacing one or more representation of the same CIs with standard representation, i.e., "Windows 7" as represented via the column 504 of the table 500.

Figure 6:
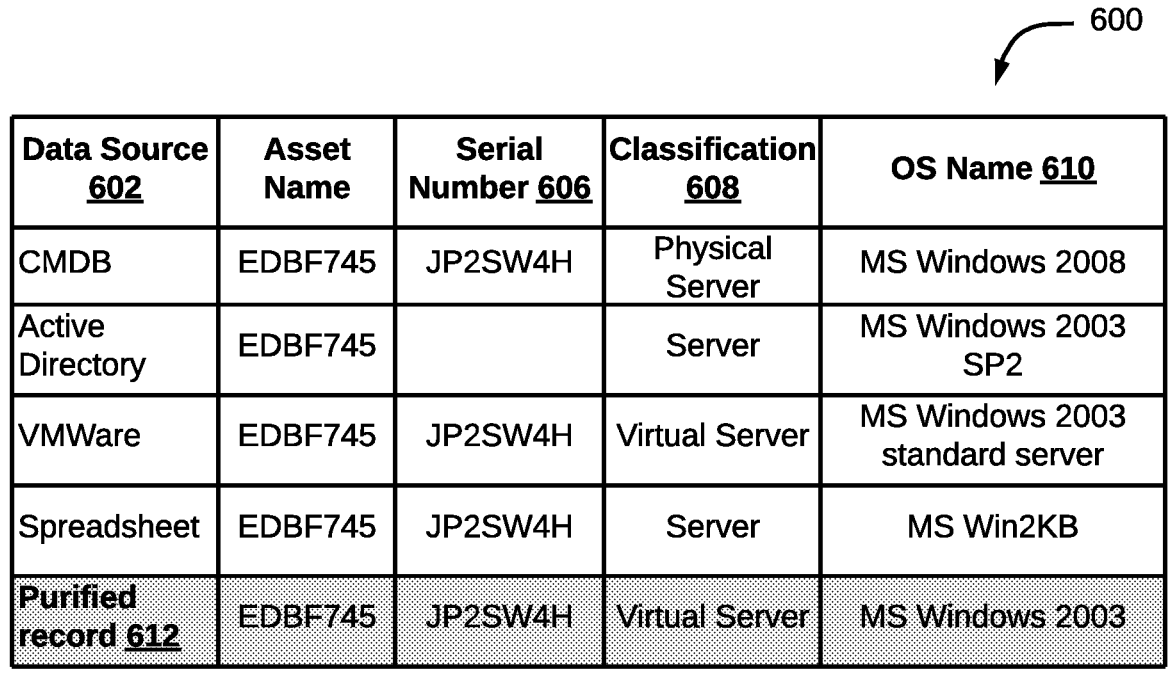
FIG. 6 is an exemplary representation of a golden dataset generated post aggregation based on the set of normalized dataset, depicted via a table, in accordance with some embodiment of the present disclosure.

Referring now to FIG. 6, an exemplary representation of a golden dataset generated based on the set of normalized dataset is depicted via a table 600, in accordance with some embodiments of the present disclosure. The table 600 may represent the golden dataset generated based on process of aggregation performed on the set of normalized dataset. With reference to FIG. 5, each of the set of normalized dataset may be represented as depicted via the table 500. In order to generate the golden dataset of clean and accurate data records, initially, one or more CIs with same attribute value may be identified from at least two of the set of normalized dataset. In an embodiment, the one or more CIs with same attribute value may be identified based on at least one of the user defined attribute. Further, the one or more CIs with same attribute value identified from at least two of the set of normalized dataset may be merged. In an embodiment, the one or more CIs with same attribute value may be merged based on the set of pre-defined prioritization rules. The set of pre-defined prioritization rules may include at least one of the set of class prioritization rules and the set of attribute prioritization rules.

In table 600, a column 602, i.e., "Data Source" may represent the plurality of data sources from which each of the plurality of CIs present in the set of normalized dataset are fetched from. A column 604, i.e., "Asset Name" may represent name of each of the plurality of CIs present in the set of normalized dataset. A column 606, i.e., "Serial Number" may represent unique identification associated with each of the plurality of CIs. A column 608, i.e., "Classification" may represent a class (e.g., a server class) associated with each of the plurality of CIs from the set of pre-defined class categories. A column 610, i.e., Operating System (OS) name may represent an attribute (e.g., an OS) associated with each of the plurality of CIs from the set of pre-defined attribute categories. Further, last row, i.e., a row 612, i.e., "Purified records" of the 600 may represent a golden record generated based on merging of the one or more CIs identified with the same attribute value from the at least two of the set of normalized dataset.

In an embodiment, the golden record may be generated for each of the one or more CIs identified with the same attribute value from the at least two of the set of normalized dataset to generate the golden dataset of clean and accurate data records. Once the golden dataset is generated, the generated golden dataset may be used further by ITSM, ITAM, or other similar IT environment of the organization for data refining purpose.

Various embodiments provide method and system for creating a unified data repository of clean and accurate data records. In particular, the disclosed method and system, described in various embodiments discussed above, may identify one or more CIs with same attribute value from each of a set of normalized dataset. Each of the set of normalized dataset is generated from a set of Configuration Items (CIs) fetched from a plurality of data sources. Further, the disclosed method and system may merge one or more CIs identified with same attribute value from at least two of the set of normalized dataset, wherein one or more CIs with same attribute value are merged to create a golden dataset.

The disclosed method and system provide some advantages like, the disclosed method and system may reduce overall volume of information obtained from humongous amount of data available in various data sources into reasonable size giving a clear and accurate picture of enterprise IT environment. The disclosed method and the system may allow data to be aggregated into summaries that may help user to make well-informed decision for business analysis purpose. Further, the disclosed method and system may enable aggregation of data from multiple data sources within customer environment, such as directory services, discovery tools, event management tools, CMDB asset database, v Centre, etc., in order to provide critical insights of IT infrastructure environment. Moreover, the disclosed method and system may minimize human intervention due to automation which may increase reliability of information. In addition, the disclosed method and system may derive new insights and discover new relationships and patterns without losing track of source data and its lineage. In addition, the disclosed method and system may enable easy identification of patterns and trends in data post aggregation, that is not immediately visible otherwise. Moreover, easy identification of patterns and trends in data may help organizations to improve their response to both external and internal catastrophe.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for creating a unified data repository of clean and accurate data records, the method comprising:
   identifying, by a repository creation system, one or more Configuration Items (CIs) with same attribute value from at least two of a set of normalized dataset, wherein each of the set of normalized dataset is generated from a plurality of CIs fetched from a plurality of data sources; and
   merging, by the repository creation system, the one or more CIs identified with same attribute value from at least two of the set of normalized dataset, based on a set of pre-defined prioritization rules, to create a golden dataset of the clean and accurate data records.

2. The method as claimed in claim 1, further comprising fetching, by the repository creation system, the plurality of CIs from the plurality of data sources, wherein the plurality of data sources comprises at least one of a Configuration Management Database (CMDB), a manual channel, a directory service, a discovery tool, a monitoring data source, an event management tool, and a patching tool.

3. The method as claimed in claim 1, further comprising:
   performing, by the repository creation system, data validation on each of the plurality of CIs to generate a validated dataset, wherein the data validation is performed by removing one or more erroneous CIs from the plurality of CIs; and
   normalizing, by the repository creation system, the validated dataset to generate a set of normalized dataset, wherein normalizing the validated dataset is performed by replacing one or more representations of same CIs in the validated dataset with a standard representation.

4. The method as claimed in claim 3, wherein removing the one or more erroneous CIs from the plurality of CIs is based on a set of pre-defined validation rules, and wherein the one or more erroneous CIs includes at least one of a NULL value, a junk value, and a special character.

5. The method as claimed in claim 3, wherein the validated dataset is normalized manually using a set of pre-defined normalization rules or automatically based on a standard product catalogue.

6. The method as claimed in claim 1, wherein identification of the one or more CIs with same attribute value is done based on at least one of a user defined attribute.

7. The method as claimed in claim 1, wherein the set of pre-defined prioritization rules comprises at least one of: a set of class prioritization rules and a set of attribute prioritization rules.

8. A system for creating a unified data repository of clean and accurate data records, the system comprising:
   a processor; and
   a memory communicatively coupled to the processor, wherein the memory stores processor executable instructions, which, on execution, causes the processor to:
   identify one or more Configuration Items (Cis) with same attribute value from at least two of a set of normalized dataset, wherein each of the set of normalized dataset is generated from a plurality of CIs fetched from a plurality of data sources; and
   merge the one or more CIs identified with same attribute value from at least two of the set of normalized dataset, based on a set of pre-defined prioritization rules, to create a golden dataset of the clean and accurate data records.

9. The system of claim 8, wherein the processor executable instructions cause the processor to fetch the plurality of CIs from the plurality of data sources, wherein the plurality of data sources comprises at least one of a Configuration Management Database (CMDB), a manual channel, a directory service, a discovery tool, a monitoring data source, an event management tool, and a patching tool.

10. The system of claim 8, wherein the processor executable instructions cause the processor to:
    perform data validation on each of the plurality of CIs to generate a validated dataset, wherein the data validation is performed by removing one or more erroneous CIs from the plurality of CIs; and
    normalize the validated dataset to generate a set of normalized dataset, wherein normalizing the validated dataset is performed by replacing one or more representations of same CIs in the validated dataset with a standard representation.

11. The system of claim 10, wherein the processor executable instructions cause the processor to remove the one or more erroneous CIs from the plurality of CIs is based on a set of pre-defined validation rules, and wherein the one or more erroneous CIs includes at least one of a NULL value, a junk value, and a special character.

12. The system of claim 10, wherein the processor executable instructions cause the processor to normalize the validated dataset manually using a set of pre-defined normalization rules or automatically based on a standard product catalogue.

13. The system of claim 8, wherein the processor executable instructions cause the processor to identify the one or more CIs with same attribute value based on at least one of a user defined attribute.

14. The system of claim 8, wherein the set of pre-defined prioritization rules comprises at least one of: a set of class prioritization rules and a set of attribute prioritization rules.

15. A non-transitory computer-readable medium storing computer-executable instructions for creating a unified data repository of clean and accurate data records, the stored instructions, when executed by a processor, cause the processor to perform operations comprises:
   identifying one or more Configuration Items (CIs) with same attribute value from at least two of a set of normalized dataset, wherein each of the set of normalized dataset is generated from a plurality of CIs fetched from a plurality of data sources; and
   merging the one or more CIs identified with same attribute value from at least two of the set of normalized dataset, based on a set of pre-defined prioritization rules, to create a golden dataset of the clean and accurate data records.

* * * * *